US007204138B2

(12) United States Patent
Du

(10) Patent No.: US 7,204,138 B2
(45) Date of Patent: Apr. 17, 2007

(54) HYDRAULIC SYSTEM HEALTH INDICATOR

(75) Inventor: Hongliu Du, Dunlap, IL (US)

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 11/369,333

(22) Filed: Mar. 7, 2006

(65) Prior Publication Data

US 2006/0162439 A1 Jul. 27, 2006

Related U.S. Application Data

(62) Division of application No. 10/628,837, filed on Jul. 28, 2003, now Pat. No. 7,043,975.

(51) Int. Cl.
*G01M 19/00* (2006.01)

(52) U.S. Cl. ........................................................ 73/168

(58) Field of Classification Search .................. 73/168
See application file for complete search history.

(56) References Cited

U.S. PATENT DOCUMENTS 4,489,551 A 12/1984 Watanabe et al.
4,852,054 A 7/1989 Mastandrea
5,001,640 A 3/1991 Matsumoto et al.
5,018,383 A 5/1991 Togai et al.
5,109,692 A 5/1992 Fitzgerald
5,333,240 A 7/1994 Matsumoto et al.
5,343,384 A 8/1994 Fisher et al.
5,439,355 A 8/1995 Jimison et al.
5,497,653 A 3/1996 Snow
5,528,928 A 6/1996 Baker et al.
5,563,351 A 10/1996 Miller
5,646,539 A 7/1997 Codina et al.
5,654,504 A 8/1997 Smith et al.
5,666,806 A 9/1997 Dietz
5,720,598 A 2/1998 de Chizzelle
5,798,941 A 8/1998 McLeister
5,865,602 A 2/1999 Nozari
5,903,215 A 5/1999 Kanno
5,966,679 A 10/1999 Snowbarger et al.
6,092,370 A 7/2000 Tremoulet, Jr. et al.
6,152,702 A 11/2000 Codina et al.
6,260,004 B1 7/2001 Hays et al.
6,301,572 B1 10/2001 Harrison
6,302,653 B1 10/2001 Bryant et al.
6,330,525 B1 12/2001 Hays et al.
6,353,815 B1 3/2002 Vilim et al.
6,374,722 B1 4/2002 Du et al.
6,375,433 B1 4/2002 Du et al.
6,466,893 B1 10/2002 Latwesen et al.
6,468,046 B1 10/2002 Du et al.
6,502,458 B1 1/2003 Kruger et al.

(Continued)

*Primary Examiner*—Hezron Williams
*Assistant Examiner*—John Fitzgerald
(74) *Attorney, Agent, or Firm*—Finnegan, Henderson, Farabow, Garrett & Dunner

(57) ABSTRACT

A method and apparatus for determining the operating health of a hydraulic system are provided. The method may include the steps of determining a plurality of operating parameters of the hydraulic system during operation of the hydraulic system, determining an estimated working condition value of the hydraulic system, modifying the estimated working condition value as a function of the operating parameters, and determining the operating health of the hydraulic system as a function of the working condition value. In one method, the working condition value may be indicative of an effective bulk modulus value of an operating fluid within at least part of the hydraulic system.

12 Claims, 4 Drawing Sheets

U.S. PATENT DOCUMENTS 6,623,247 B2 9/2003 Du
6,654,697 B1 11/2003 Eryurek et al.
6,678,584 B2 1/2004 Junk et al.
6,807,501 B1 10/2004 Hyde
6,807,855 B2 10/2004 Stroup
6,810,718 B2 11/2004 Wilson et al.
6,882,960 B2 4/2005 Miller
6,885,976 B2 4/2005 Yoshiki et al.
2002/0040280 A1 4/2002 Morgan

HYDRAULIC SYSTEM HEALTH INDICATOR

This application is a divisional of and claims priority to U.S. patent application Ser. No. 10/628,837 entitled "Hydraulic System Health Indicator" and filed on Jul. 28, 2003 now U.S. Pat. No. 7,043,975 for Hongliu Du, which is incorporated herein by reference.

TECHNICAL FIELD

This invention relates generally to an apparatus and method for indicating a health condition of a hydraulic system, and more particularly to indicating a health condition of a hydraulic system, pump, actuator, or other hydraulic device.

BACKGROUND

Many work machines, such as earthworking machines or the like, include hydraulic systems and components for running motors and/or extending and retracting cylinders, for example. These hydraulic systems may include pumps and actuators, or the like, having moving parts and seals that may wear over time and that may eventually fail. In addition to wear, such conditions as cavitation (e.g., the formation of cavities and their collapse within a hydraulic fluid of a hydraulic system) within a pump or another hydraulic component may harm the component or system or cause it to fail. If the failure of a component is catastrophic, substantial debris may be introduced into the hydraulic system causing damage to other components. If, however, an impending failure is predicted or sensed prior to catastrophic failure, a deteriorating component may be replaced or repaired before damage to other components is caused. Moreover, if impending failure of a component is detected, maintenance on the component could be scheduled at the most opportune time to reduce the productivity losses typically caused by such a maintenance operation.

An exemplary hydraulic component is an axial piston type pump. As the operating health of such a pump begins to deteriorate, for example by wear or cavitation within the system, operational inefficiencies may increase, system response may be slowed, and instability of the hydraulic system may result. These effects may be typified by fluid leaks (a) within the pump chamber past the pistons to the case drain and/or (b) across the pump input and output ports, for example.

Without an appropriate method or apparatus for indicating or predicting such conditions as excessive wear or cavitation within a pump or other hydraulic component, impending failures may not be easily predicted, and thus the likelihood of catastrophic failures causing damage within a hydraulic system increases substantially. Likewise, repairs may not be scheduled effectively to reduce losses of productivity during repair. Similarly, increased leakage or cavitation within a system may lead to increased fuel consumption and decreased productivity, which conditions may not be otherwise detected.

Accordingly, the present invention is directed to overcoming one or more of the problems set forth above.

SUMMARY OF THE INVENTION

According to one aspect of the invention, a method is provided for determining the operating health of a hydraulic system. The method may include the steps of determining a plurality of operating parameters of the hydraulic system during operation of the hydraulic system, and using the operating parameters to determine one or more working condition values of the system. Further, a first one of the one or more working condition values may be indicative of an effective bulk modulus value of an operating fluid within at least part of the hydraulic system.

According to another aspect of the invention, an apparatus is provided for determining the operating health of a hydraulic system. The apparatus may include a plurality of sensors operably connected to the hydraulic system and operable to indicate operating parameters of the hydraulic system during operation of the hydraulic system, and at least one processor operably connected in electrical communication with the sensors, the at least one processor being operable to determine one or more working condition values as a function of the actual operating parameters. Further, a first one of the one or more working condition values may be indicative of an effective bulk modulus value of an operating fluid within at least part of the hydraulic system.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several exemplary embodiments of the invention and, together with the description, serve to explain the principles of the invention. In the drawings.

Although the drawings represent several embodiments of the present invention, the drawings are not necessarily to scale, and certain features may be exaggerated in order to better illustrate and explain the present invention. The exemplifications set out herein illustrate exemplary embodiments of the invention and such exemplifications are not to be construed as limiting the scope of the invention in any manner.

DETAILED DESCRIPTION

Reference will now be made in detail to embodiments of the invention, examples of which are illustrated in the accompanying drawings. Wherever possible, the same or corresponding reference numbers will be used throughout the drawings to refer to the same or corresponding parts.

Figure 1:
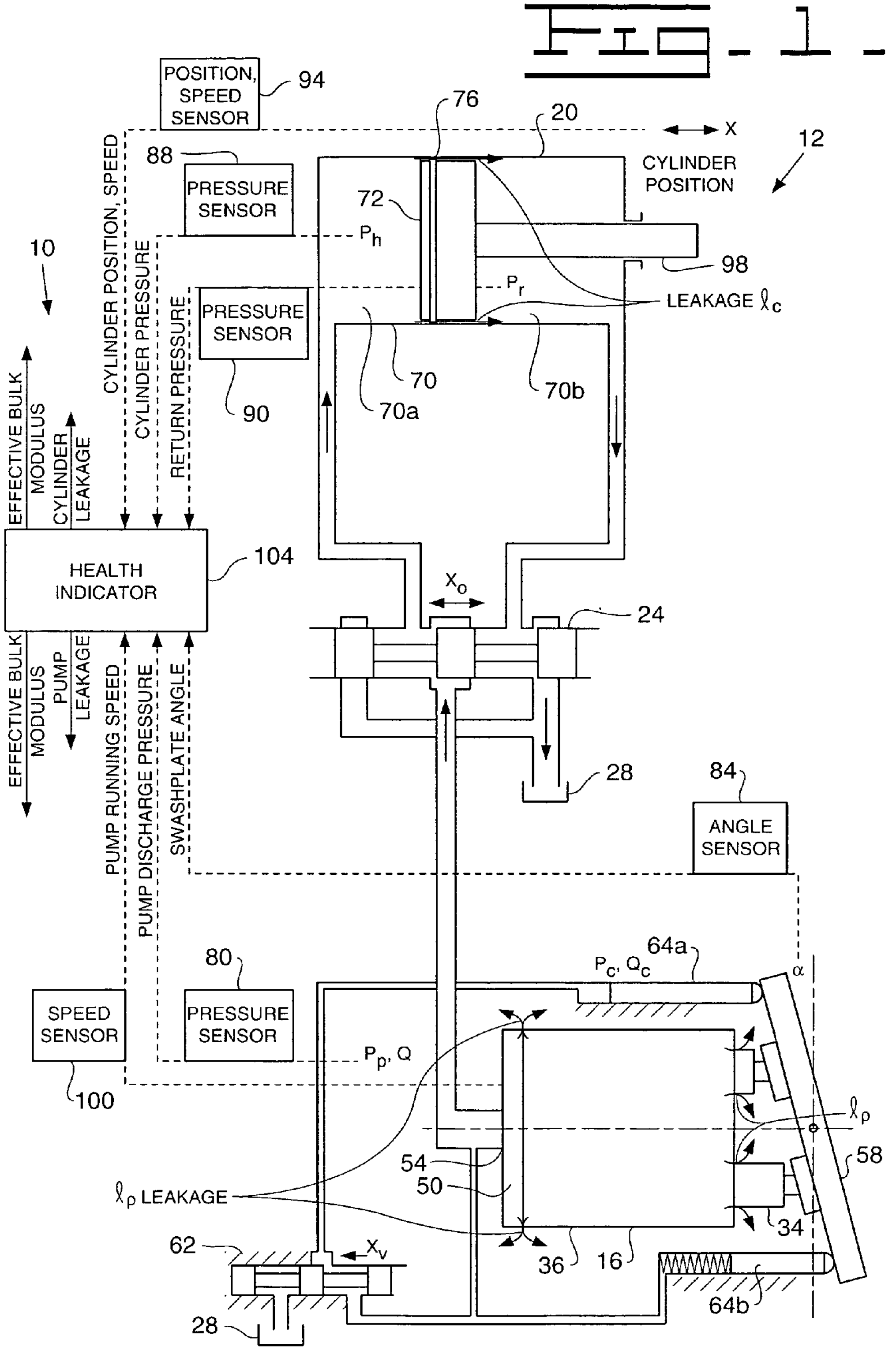
FIG. 1 is a partial diagrammatic illustration and partial block diagram of an exemplary hydraulic system health indicator operatively connected with an exemplary hydraulic system.

FIG. 1 shows an exemplary hydraulic system health indicator 10 operatively connected with an exemplary hydraulic system 12. The hydraulic system 12 of FIG. 1 includes a first fluid drive member 16, such as an axial piston type pump or motor, hydraulically connected with a second fluid drive member 20, such as a piston and cylinder arrangement. The first fluid drive member 16 (hereinafter referred to as pump 16) may supply pressurized fluid (P, Q) to the second fluid drive member 20 (hereinafter referred to as hydraulic actuator 20), for example through a valve 24, such as a four-way operating valve. The valve 24 may be disposed in hydraulic communication with a tank 28 so that the actuator 20 may receive operating fluid from the tank 28 or transmit operating fluid to the tank 28 as needed during operation of the hydraulic system 12.

It should be appreciated that the terms "first fluid drive member" and "second fluid drive member" are used herein for explanatory purposes and may be interchangeably applied to a pump, a piston and cylinder arrangement, a hydraulic motor, and various other components of a hydraulic system, such as those components within the system that drive an operating fluid (e.g., a pump) or are driven by an operating fluid (e.g., a piston and cylinder arrangement, a hydraulic motor, or some other hydraulic actuator, for example).

Briefly, and with reference to FIGS. 2 and 3, further description of an exemplary fluid drive member 16 will be described. The pump 16 of FIGS. 2 and 3 may be a variable displacement hydraulic pump 16 and, more specifically, may be an axial piston swashplate hydraulic pump 16 having a plurality of pistons 34, e.g., nine, located in a circular array within a cylinder block 36. The pistons 34 may be spaced at equal intervals about a shaft 32, located at a longitudinal center axis of the block 36. The cylinder block 36 is compressed tightly against a valve plate 50 by means of a cylinder block spring 44. The valve plate 50 includes an intake port 52 and a discharge port 54. Each piston 34 is connected to a slipper 38, for example by means of a ball and socket joint 40. Each slipper 38 is maintained in contact with a swashplate 58. The swashplate 58 is inclinably mounted to the pump 16, the angle of inclination $\alpha$ being controllably adjustable.

Figure 2:
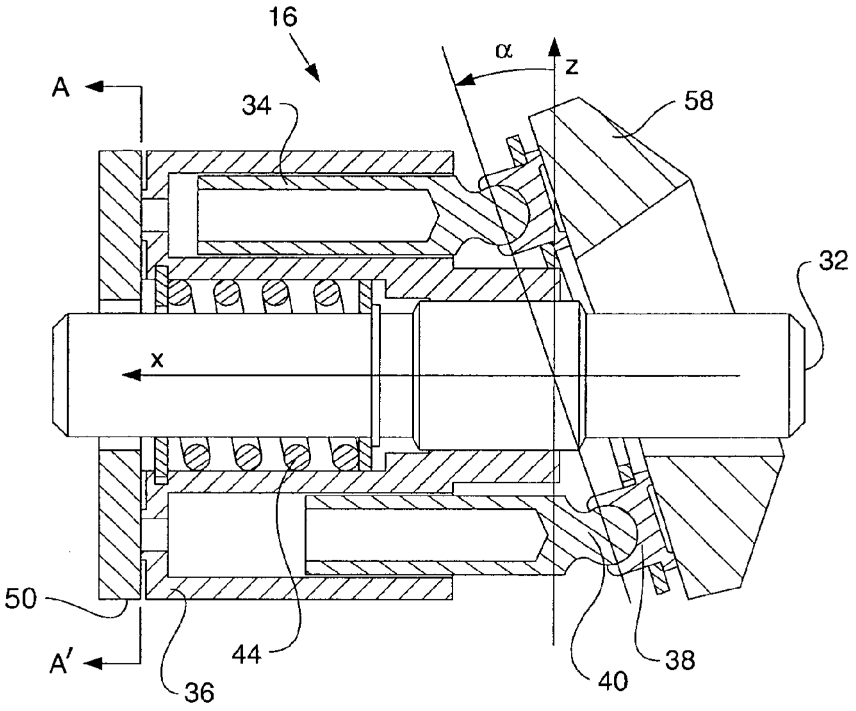
FIG. 2 is a diagrammatic side profile cutaway view of an exemplary fluid drive member suitable for use with the present invention.
Figure 3:
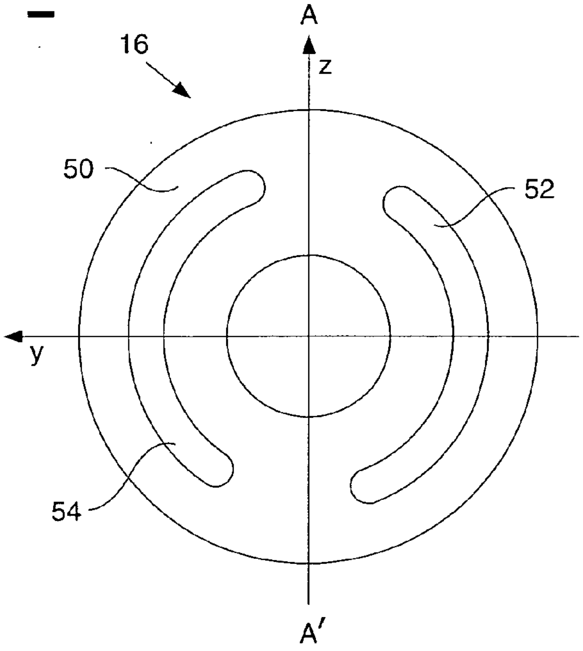
FIG. 3 is a diagrammatic end view of the porting side of the fluid drive member of FIG. 2.

With continued reference to FIGS. 2 and 3, operation of the pump 16 is illustrated. The cylinder block 36 may rotate at a constant angular speed $\omega$, for example under the force of a motor output shaft 32. As a result, each piston 34 periodically passes over each of the intake and discharge ports 52, 54 of the valve plate 50. The angle of inclination $\alpha$ of the swashplate 58 causes the pistons 34 to undergo an oscillatory displacement in and out of the cylinder block 36, thus drawing hydraulic fluid into the intake port 52, which is a low pressure port, and out of the discharge port 54, which is a high pressure port. Referring to FIG. 1, a valve 62, such as a three-way control valve, may be hydraulically connected between the discharge port 54 and a control actuator 64*a*, 64*b* to meter fluid (e.g., $P_c$, $Q_c$) into or out of the control actuator 64*a*, 64*b* for adjusting the swashplate angle $\alpha$. Thus, the position of the valve 62 may be controlled to regulate the pump's 16 discharge flow rate and/or the pump's 16 discharge pressure, both of which may be affected by changes in the swashplate angle $\alpha$.

Referring again to FIG. 1, two types of exemplary leakage $l_p$ may exist in the pump 16: (1) leakage $l_p$ within the cylinder block 36 past the pistons 34 to a case drain (not shown); and (2) leakage $l_p$ across the intake and discharge ports 52, 54 (FIG. 3). Both of these leakage flows are generally laminar in nature and are generally proportional to (a) the matching tolerance or gap between the pump's 16 parts during operation and (b) the pressure drop across the gap. As the tolerance/gap between the parts increases (as with wear of the pump parts), or as the pressure drop across the gap increases, pump leakage $l_p$ within the system 12 increases.

Similarly, and with continued reference to FIG. 1, exemplary leakage $l_c$ may exist in the actuator (cylinder) 20 as a result of, for example, (a) the matching tolerance or gap between the actuator cylinder 70 and the actuator piston 72 during operation and (b) the pressure drop between the head end chamber 70*a* and the rod end chamber 70*b* within the actuator 20. A seal 76 may be provided on the surface of the piston 72 to reduce such leakage $l_c$. It should be appreciated, however, that if the seal 76 fails to function properly, or if the actuator parts are excessively worn, the leakage $l_c$ within the actuator 20 may significantly increase.

Large fluid leakages $l_p$, $l_c$ may cause a considerable phase delay during operation of the hydraulic system 12, thus decreasing system response and potentially causing system instability. Moreover excessive leakage may generate large amounts of heat and may cause the system temperature to rise, a condition which may be harmful to system operation and may waste excessive energy. Moreover, as discussed above, cavitation within the hydraulic system 12 may introduce additional system inefficiencies and/or cause significant harm to the system 12. Thus, detection of such harmful conditions as leakage and cavitation within the system 12 may provide significant advantages. Further, the ability to not only detect, but to also distinguish between such conditions as leakage and cavitation within the system 12 may provide additional advantages, such as the ability to more easily determine root causes of system inefficiencies.

The effective fluid bulk modulus $\beta$ of a hydraulic system reflects the overall effective compressibility of the operating fluid within the system. Thus, changes in the effective bulk modulus $\beta$ of a hydraulic system, or a portion thereof, may directly impact a hydraulic system's stiffness, performance, and stability. Many operating factors may affect the effective bulk modulus $\beta$ of a system 12. For example, stretching of elastic connecting hoses within a hydraulic system 12 may decrease the system's effective bulk modulus $\beta$. In addition, a small amount of entrapped air within a hydraulic line or component may dramatically decrease the system's effective bulk modulus $\beta$. Moreover, cavitation within a system 12 may decrease the effective bulk modulus $\beta$. Thus, effective monitoring of a system's effective bulk modulus $\beta$ may help detect undesirable conditions within a hydraulic system 12, such as the presence of cavitation or entrapped air within the system 12.

Referring again to FIG. 1, a hydraulic system health indicator 10 may include a plurality of sensors operable to indicate actual operating parameters of the pump 16 and the actuator 20 during operation of the hydraulic system 12. As explained further below, these operating parameters may be used by the health indicator 10 to determine an effective bulk modulus $\beta$, and/or other working condition values, of the hydraulic system 12.

A pump discharge pressure sensor 80, which may be located at the discharge port 54 of the pump 16, may be adapted to sense the discharge pressure of hydraulic fluid from the pump 16. Alternatively, the discharge pressure sensor 80 may be located at any position suitable for sensing the pressure of the fluid at the discharge port 54, such as at a point along the hydraulic fluid line downstream from the discharge port 54, and the like. In a preferred embodiment, the pump discharge pressure sensor 80 is of a type well known in the art and suited for sensing pressure of hydraulic fluid.

A swashplate angle sensor 84, which may be located at the swashplate 58, may be adapted to sense the tilt angle $\alpha$ of the swashplate 58. For example, the swashplate angle sensor 84 may be a Hall effect based rotary sensor or some other type of sensor well known in the art.

A pump speed sensor 100, which may be connected to the pump 16, may be adapted to sense the pump running speed ω or running position. For example, the pump speed sensor 100 may be connected to the shaft 32 (FIG. 2). Alternatively, the pump speed sensor 100 may be connected to any member suitable for determining a value indicative of the pump running speed ω, such as the cylinder block 36, an engine (not shown) that is driving the shaft 32, or the like.

A first actuator pressure sensor 88, which may be located at a head end chamber 70*a* of the actuator 70, may be adapted to sense the fluid pressure within the head end chamber 70*a* of the actuator 70. A second actuator pressure sensor 90, which may be located at a rod end chamber 70*b* of the actuator 70, may be adapted to sense the fluid pressure within the rod end chamber 70*b* of the actuator 70. It should be appreciated that the first and second actuator pressure sensors 88, 90 may be located at any positions suitable for sensing the pressure of the fluid within the head and rod end chambers 70*a*, 70*b* of the actuator 20, such as at points upstream or downstream from the head and rod end chambers 70*a*, 70*b*, as appropriate. In a preferred embodiment, the first and second actuator pressure sensors 88, 90 are of a type well known in the art and suited for sensing pressure of hydraulic fluid.

An actuator position and/or speed sensor 94 (generally referred to herein as speed sensor 94), which may be located at the actuator 20, may be adapted to sense the position and/or operating speed of the actuator 20, such as the position and/or speed of the piston 72 within the actuator 20. Alternatively, the speed sensor 94 may be located at any position suitable for sensing the position and/or speed of the piston 72, such as at a point along a rod 98 of the actuator 20, and the like. In a preferred embodiment, the speed sensor 94 is of a type well known in the art and suited for sensing position and/or speed.

A processor 104 may be operably connected with and adapted to receive sensed information regarding operating parameters of the hydraulic system 12, such as from the pump discharge pressure sensor 80, the swashplate angle sensor 84, the pump speed sensor 100, the first and second actuator pressure sensors 88, 90, the actuator speed sensor 94, and/or any other appropriate sensor. It should be appreciated that the processor 104 may be disposed, for example, on a machine (not shown), such as an earthworking machine, and the machine may use a hydraulic system health indicator 10 to determine the operating health of a hydraulic system 12 located on the machine. It should further be appreciated that the term "operably connected" may include, but is not limited to, a hard-wired electrical connection as well as an electrical communication established remotely between the devices, such as by infrared signals, RF signals, or the like.

The processor 104 may be adapted to determine one or more working condition values as a function of the actual operating parameters of the hydraulic system 12, such as the operating parameters of the pump 16 and the actuator 20. The working condition value(s) may be indicative, for example, of an effective bulk modulus β of at least part of the hydraulic system 12. In addition, or in the alternative, the working condition value(s) may be indicative of an amount of leakage within at least part of the hydraulic system 12, indicative of an entrapped air condition (e.g., the presence or absence of entrapped air) within at least part of the hydraulic system 12, and/or indicative of a cavitation condition (e.g., the presence or absence of cavitation) within the hydraulic system 12.

Operation of the processor 104 is discussed in greater detail below.

Figure 4:
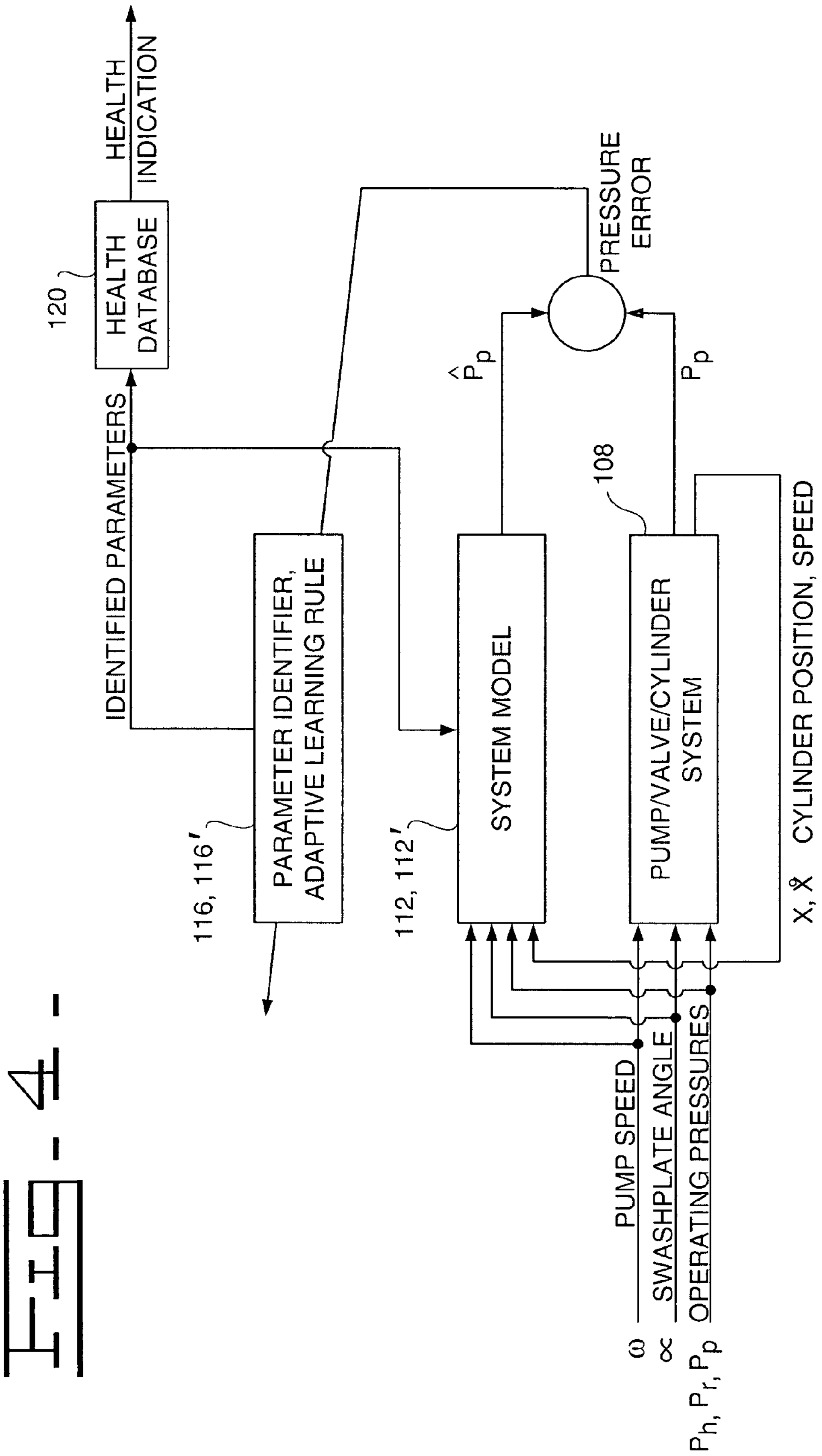
FIG. 4 is a control diagram for the hydraulic system health indicator of FIG. 1.

Referring to FIG. 4, an identification diagram representative of an exemplary embodiment of the present invention is shown.

Block 108 of FIG. 4 is representative of the system dynamics associated with the hydraulic system 12 shown in FIG. 1. For example, block 108 indicates that the operating speed ω of the pump 16, the swashplate angle α, the pump discharge pressure $P_p$ (i.e., the pump operating pressure), and the position x and speed $\dot{x}$ of the actuator 20 are each inter-related parameters of the hydraulic system 12 such that modification of one of the parameters may generally affect another parameter. It should be appreciated that other parameters, such as operating pressures of the actuator 20 may also be inter-related to the parameters listed immediately above herein.

For example, using the pump 16 as a reference point, the pump 16 discharge pressure dynamics may be expressed as:

$$\dot{P}_p = \frac{\beta_{ep}}{V(\alpha)}(D_p\omega\alpha - Q_{leak}(P_p) - Q_{load}) \tag{1}$$

where:

$P_p$ is the pump discharge pressure;

$\beta_{ep}$ is the effective fluid bulk modulus of the pump 16;

$D_p$ is the pump displacement coefficient, which is a constant associated with the maximum displacement of the pump 16;

ω is the pump running speed;

α is the swashplate angle;

V(α) is the volume of the pump discharge chamber and is swashplate angle dependent;

$Q_{leak}$ represents pump leakage and is dependent on the pump discharge pressure; and $Q_{load}$ is the load flow. Since pump leakage is generally in the form of laminar flow (i.e. $Q_{leak}(P_p)=C_{lp}P_p$), where $C_{lp}$ is a pump leakage coefficient, Eq. (1) can be further written as:

$$\dot{P}_p = \beta_{ep}\frac{D_p\omega\alpha}{V(\alpha)} - \frac{\beta_{ep}C_{lp}}{V(\alpha)}P_p - \frac{\beta_{ep}}{V(\alpha)}Q_{load} \tag{2}$$

Similarly, using the actuator 20 as a reference point, the cylinder head end 70*a* control pressure dynamics can be written as:

$$\dot{P}_h = \frac{\beta_{ec}}{V(x)}(Q_{in} - C_{lc}(P_h - P_r) - A_h\dot{x}) \tag{3}$$

where:

$P_h$ is the cylinder head end control pressure;

$\beta_{ec}$ is the effective fluid bulk modulus of the cylinder;

$P_r$ is the cylinder rod end return pressure;

x is the cylinder (piston) position;

$\dot{x}$ is the cylinder (piston) speed;

$A_h$ is the cylinder piston sectional area on the head end side;

V(x) is the volume of the cylinder head end control chamber and is dependent on the cylinder position;

$C_{lc}$ is a cylinder leakage coefficient; and $Q_{in}$ is the flow rate of the fluid that flows into the cylinder head end chamber 70*a* and that comes from the pump 16 via the valve 24. Again, the internal leakage in the cylinder is generally in the form of laminar flow and can be expressed as $C_{lc}(P_h-P_r)$.

Further addressing the system 12 from a perspective based on the pressure discharge dynamics of the pump 16, neglecting the compressibility in the cylinder $$\left(\text{assuming } \frac{\beta_{ec}}{V(x)} \to \infty\right),$$

and substituting Eq. (3) into Eq. (2), it is submitted that, since $Q_{load}=Q_{in}$ and $Q_{in}\approx C_{lc}(P_h-P_r)+A_h\dot{x}$, $$\dot{P}_p = \beta_{ep}\frac{D_p\omega\alpha}{V(\alpha)} - \frac{\beta_{ep}C_{lp}}{V(\alpha)}P_p - \frac{\beta_{ep}}{V(\alpha)}(C_{lc}(P_h-P_r)-A_h\dot{x}) \quad (4)$$

Further, $$\dot{P}_p = \beta_{ep}\left(\frac{D_p\omega\alpha}{V(\alpha)} - \frac{A_h\dot{x}}{V(\alpha)}\right) - \beta_{ep}C_{lp}\frac{P_p}{V(\alpha)} - \beta_{ep}C_{lp}\frac{P_h-P_r}{V(\alpha)} \quad (5)$$

Letting $$u = \frac{D_p\omega\alpha}{V(\alpha)} - \frac{A_h\dot{x}}{V(\alpha)} \quad (6a)$$

$$f(P_p, t) = \frac{P_p}{V(\alpha)} \quad (6b)$$

$$f(P_h-P_r, t) = \frac{P_h-P_r}{V(\alpha)} \quad (6c)$$

then, $$\dot{P}_p=-\beta_{ep}C_{lp}f(P_p,t)-\beta_{ep}C_{lc}f(P_h-P_r,t)+\beta_{ep}u \quad (7)$$

or $$\dot{P}_p=\phi_pf(P_p,t)+\phi_cf(P_h-P_r,t)+\beta_{ep}u \quad (8)$$

where $\phi_p=-\beta_{ep}C_{lp}$ and $\phi_c=-\beta_{ep}C_{lc}$. Thus, changes in the system's working constants, such as $\phi_p$, $\phi_c$, $C_{lp}$, $C_{lc}$, and $\beta_{ep}$—i.e., the system's working condition values—indicate the operating health of the pump 16 and the actuator 20. For example, $\phi_p$, $\phi_c$, $C_{lp}$, and $C_{lc}$ are constants indicative of amounts of leakage within the pump 16 and the actuator 20. For example, smaller $\phi_p$ and $\phi_c$ indicate smaller amounts of leakage in the pump 16 and the actuator 20. Moreover, cavitation and/or trapped air within the system 12 may be indicated by a decrease in the effective bulk modulus value $\beta_{ep}$.

The system 12 may also be evaluated further from a perspective based on the control pressure dynamics of the actuator 20. For example, by neglecting the compressibility in the pump $$\left(\text{assuming } \frac{\beta_{ep}}{V(\alpha)} \to \infty\right),$$

and substituting Eq. (1) into Eq. (3), it is submitted that ($Q_{load}=Q_{in}$ and $Q_{load}\approx D_p\omega\alpha-C_{lp}P_p$), $$\dot{P}_h = \frac{\beta_{ec}}{V(x)}(D_p\omega\alpha - C_{lp}P_p) - \frac{\beta_{ec}}{V(x)}C_{lc}(P_h-P_r) - \frac{\beta_{ec}}{V(x)}A_h\dot{x} \quad (9)$$

Further, $$\dot{P}_h = -\beta_{ec}C_{lp}\frac{P_p}{V(x)} - \beta_{ec}C_{lc}\frac{P_h-P_r}{V(x)} + \beta_{ec}\left(\frac{D_p\omega\alpha}{V(x)} - \frac{A_h\dot{x}}{V(x)}\right) \quad (10)$$

Letting $$u = \frac{D_p\omega\alpha}{V(x)} - \frac{A_h\dot{x}}{V(x)} \quad (11a)$$

$$g(P_p, t) = \frac{P_p}{V(x)} \quad (11b)$$

$$g(P_h-P_r, t) = \frac{P_h-P_r}{V(x)} \quad (11c)$$

then, $$\dot{P}_h=-\beta_{ec}C_{lc}g(P_h-P_r,t)-\beta_{ec}C_{lp}g(P_p,t)+\beta_{ec}u \quad (12)$$

or $$\dot{P}_h=\gamma_cg(P_h-P_r,t)+\gamma_pg(P_p,t)+\beta_{ec}u \quad (13)$$

where $\gamma_p=-\beta_{ec}C_{lp}$ and $\gamma_c=-\beta_{ec}C_{lc}$. For the same reason as before, changes in the system's working constants, such as $\gamma_p$, $\gamma_c$, $C_{lp}$, $C_{lc}$, and $\beta_{ec}$—i.e., the system's working condition values—indicate the operating health of the pump 16 and the actuator 20. For example, $\gamma_p$, $\gamma_c$, $C_{lp}$, and $C_{lc}$ are constants indicative of amounts of leakage within the pump 16 and the actuator 20. For example, smaller $\gamma_p$ and $\gamma_c$ indicate smaller amounts of leakage in the pump 16 and the cylinder 20. Moreover, cavitation and trapped air within the system 12 may be indicated by a decrease in the effective bulk modulus value $\beta_{ec}$. It should be further appreciated that, when the system 12 is evaluated as a whole, $\beta_{ec}$ and $\beta_{ep}$ may generally be equal to each other since working fluid conditions may generally be propagated from the pump 16 to the actuator 20 or vice versa.

Block 112 of FIG. 4 represents a model of the system 12 shown in FIG. 1, the model being used in one embodiment along with an adaptive learning rule 116 to identify desired working condition values—e.g., $\phi_p$, $\phi_c$, $\gamma_p$, $\gamma_c$, and $\beta_{ep}$, $\beta_{ec}$.

Addressing the system 12 from a perspective based on the pressure discharge dynamics of the pump 16, an estimator dynamics rule, or system model 112, may be indicated as follows:

$$\dot{\hat{P}}_p = a_m\hat{P}_p - a_mP_p + \hat{\varphi}_pf(P_p,t) + \hat{\varphi}_cf(P_h-P_r,t) + \hat{\beta}_{ep}u \quad (14)$$

where $\alpha_m$ is a constant that is greater than zero and "^" indicates estimated system parameters or variables. Subtracting Eq. (7) from Eq. (14), it is submitted that the error dynamics may be expressed as follows:

$$\Delta\dot{P}_p = \alpha_m\Delta P_p + \Delta\phi_pf(P_p,t) + \Delta\phi_cf(P_h-P_r,t) + \Delta\beta_{ep}u \quad (15)$$

where $\Delta P_p = \hat{P}_p - P_p$, $\Delta\phi_p = \hat{\phi}_p - \phi_p$, $\Delta\phi_c = \hat{\phi}_c - \phi_c$, and $\Delta\beta_{ep} = \hat{\beta}_{ep} - \beta_{ep}$. Taking a Lyapunov function candidate as $$V = \frac{1}{2}\eta\Delta P_p^2 + \frac{1}{2}\Delta\varphi_p^2 + \frac{1}{2}\Delta\varphi_c^2 + \frac{1}{2}\Delta\beta_{ep}^2, \quad (16)$$

the derivative with respect to time along the system trajectory is $$\dot{V} = \eta\Delta P_p\Delta\dot{P}_p + \Delta\phi_p\Delta\dot{\phi}_p + \Delta\phi_c\Delta\dot{\phi}_c + \Delta\beta_{ep}\Delta\dot{\beta}_{ep} \quad (17)$$

or $$\dot{V} = \eta\Delta P_p(a_m\Delta P_p + \Delta\varphi_pf(P_p,t) + \Delta\varphi_cf(P_h-P_r,t) + \Delta\beta_{ep}u) + \Delta\varphi_p\Delta\dot{\varphi}_p + \Delta\varphi_c\Delta\dot{\varphi}_c + \Delta\beta_{ep}\Delta\dot{\beta}_{ep} \quad (18)$$

It is submitted that an adaptive learning rule (Eq. 19 below) 116 may be used to identify the desired working condition values of $\phi_p$, $\phi_c$, and $\beta_{ep}$. Thus, if $$\Delta\dot{\varphi}_p = \dot{\hat{\varphi}}_p = -\eta\Delta P_pf(P_p,t) \quad (19a)$$

$$\Delta\dot{\varphi}_c = \dot{\hat{\varphi}}_c = -\eta\Delta P_pf(P_h-P_r,t) \quad (19b)$$

$$\Delta\dot{\beta}_{ep} = \dot{\hat{\beta}}_{ep} = -\eta\Delta P_pu \quad (19c)$$

then $$\dot{V} = a_m\eta\Delta P_p^2 \le 0 \quad (20)$$

where $\eta$ is a constant learning rate. With $\eta$ being a positive constant, then $\Delta P_p$ and $\Delta\phi_p$, $\Delta\phi_c$, and $\Delta\beta_{ep}$ are globally bounded. Moreover, since $f(P_p, t)$ and $f(P_h-P_r,t)$ are bounded, then $\Delta P_p(t)\to 0$ as $t\to\infty$. Further, with persistent excitation, it is submitted that $\Delta\phi_p\to 0$, $\Delta\phi_c\to 0$, and $\Delta\beta_{ep}\to 0$ as $t\to\infty$. This relationship indicates that, using the adaptive learning rule 116 of Eq. 19, error convergence can be guaranteed and the desired working condition values—e.g., $\phi_p$, $\phi_c$, and $\beta_{ep}$—may be accurately identified.

Similarly, addressing the system from a perspective based on the cylinder head end control pressure, an estimator dynamics rule, or system model 112', may be indicated as follows:

$$\dot{\hat{P}}_h = a_n\hat{P}_h - a_nP_h + \hat{\gamma}_cg(P_h-P_r,t) + \hat{\gamma}_pg(P_p,t) + \hat{\beta}_{ec}u \quad (21)$$

where $\alpha_n$ is positive constant and "^" indicates estimated parameters or variables. Subtracting Eq. (13) from Eq. (21), it is submitted that the error dynamics may be expressed as $$\Delta\dot{P}_h = \alpha_n\Delta P_h + \Delta\gamma_cg(P_h-P_r,t) + \Delta\gamma_pg(P_p,t) + \Delta\beta_{ec}u \quad (22)$$

where $\Delta P_h = \hat{P}_h - P_h$, $\Delta\gamma_p = \hat{\gamma}_p - \gamma_p$, $\Delta\gamma_c = \hat{\gamma}_c - \gamma_c$, and $\Delta\beta_{ec} = \hat{\beta}_{ec} - \beta_{ec}$. Taking a Lyapunov function candidate as $$V = \frac{1}{2}\mu\Delta P_h^2 + \frac{1}{2}\Delta\gamma_p^2 + \frac{1}{2}\Delta\gamma_c^2 + \frac{1}{2}\Delta\beta_{ep}^2 \quad (23)$$

the derivative with respect to time along the system trajectory is $$\dot{V} = \mu\Delta P_h\Delta\dot{P}_h + \Delta\gamma_p\Delta\dot{\gamma}_p + \Delta\gamma_c\Delta\dot{\gamma}_c + \Delta\beta_{ep}\Delta\dot{\beta}_{ep} \quad (24)$$

or $$\dot{V} = \mu\Delta P_h(a_n\Delta P_h + \Delta\gamma_pg(P_p,t) + \Delta\gamma_cg(P_h-P_r,t) + \Delta\beta_{ep}u) + \Delta\gamma_p\Delta\dot{\gamma}_p + \Delta\gamma_c\Delta\dot{\gamma}_c + \Delta\beta_{ep}\Delta\dot{\beta}_{ep} \quad (25)$$

It is submitted that an additional or alternative adaptive learning rule (Eq. 26 below) 116' may be used to identify the desired working condition values of $\gamma_p$, $\gamma_c$, and $\beta_{ec}$. Thus, if $$\Delta\dot{\gamma}_p = \dot{\hat{\gamma}}_p = -\mu\Delta P_hg(P_p,t) \quad (26a)$$

$$\Delta\dot{\gamma}_c = \dot{\hat{\gamma}}_c = -\mu\Delta P_hg(P_h-P_r,t) \quad (26b)$$

$$\Delta\dot{\beta}_{ep} = \dot{\hat{\beta}}_{ep} = -\mu\Delta P_hu \quad (26c)$$

then $$\dot{V} = a_n\mu\Delta P_h^2 \le 0 \quad (27)$$

where $\eta$ is a constant learning rate. With $\mu$ being a positive constant, then $\Delta P_h$ and $\Delta\gamma_p$, $\Delta\gamma_c$, and $\Delta\beta_{ec}$ are globally bounded. Moreover, since $g(P_p, t)$ and $g(P_h-P_r,t)$ are bounded, then $\Delta P(t)\to 0$ as $t\to\infty$. With persistent excitation, it is submitted that $\Delta\gamma_p\to 0$, $\Delta\gamma_c\to 0$, and $\Delta\beta_{ec}\to 0$ as $t\to\infty$. This relationship indicates that, with the adaptive learning rule 116' of Eq. 26, error convergence can be guaranteed and the desired working condition values—e.g., $\gamma_p$, $\gamma_c$, and $\beta_{ec}$—may be accurately identified.

Additionally, once the desired working condition values—e.g. $\phi_p$, $\phi_c$, $\gamma_p$, $\gamma_c$, and/or $\beta_{ep}$, $\beta_{ec}$—have been accurately identified using the system model 112, 112' and the adaptive learning rule 116, 116', these values may be entered into a health database 120, which may form a part of the health indicator 104 shown in FIG. 1, and an operating health of the hydraulic system 12 may be indicated. For example, as described above, the values of $\phi_p$, $\phi_c$, $\gamma_p$, and $\gamma_c$ are indicative of amounts of leakage occurring within the pump 16 and/or the cylinder 20 during operation of the hydraulic system 12. Further, the effective bulk modulus values $\beta_{ep}$, $\beta_{ec}$ may be used to detect cavitation and/or trapped air within the system 12 during operation of the system 12.

Figure 5:
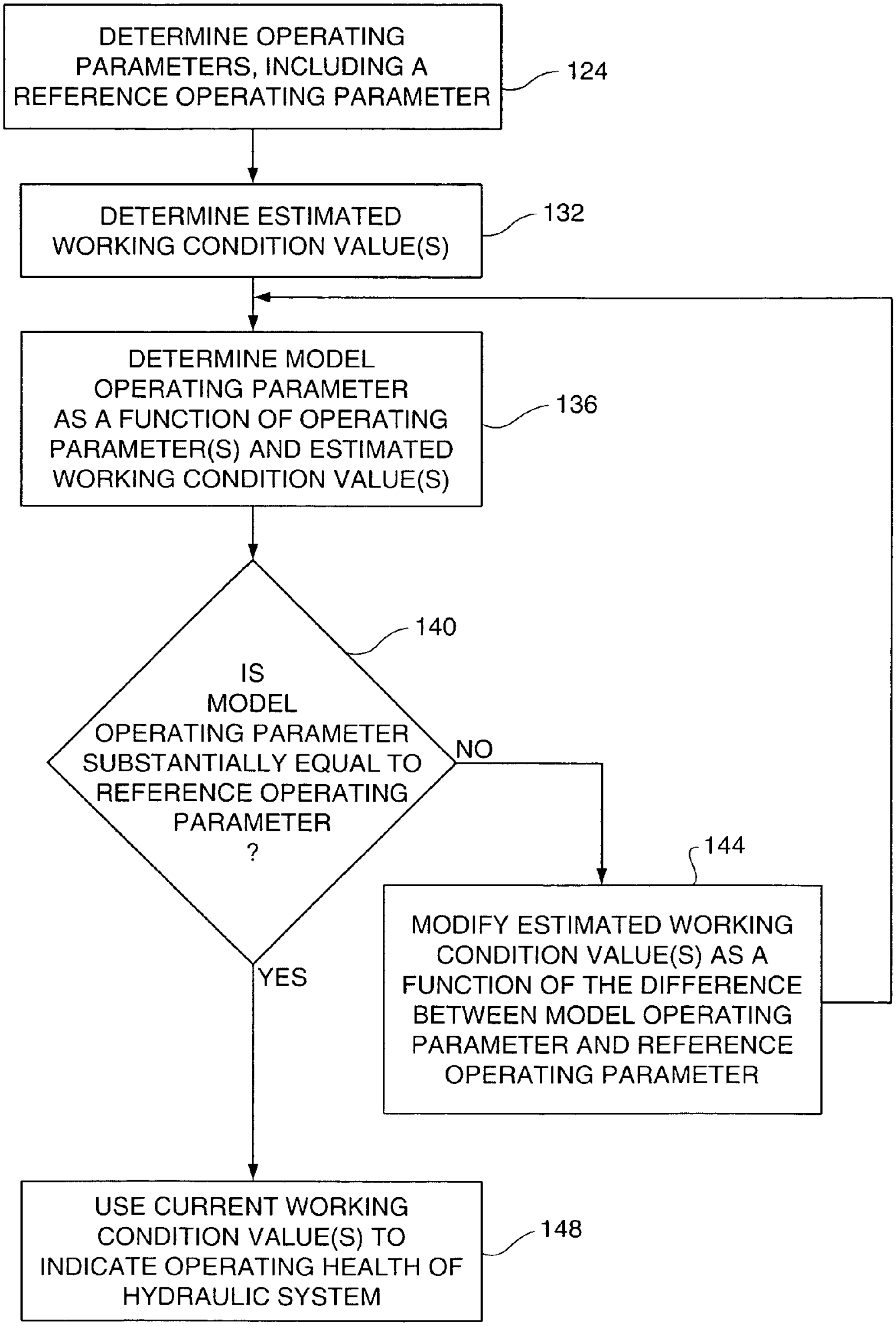
FIG. 5 is a flow diagram illustrating an exemplary method according to the present invention.

Referring to FIG. 5, a flow diagram illustrating one method according to the present invention is shown.

In a first flow block 124, one or more operating parameters, including a reference operating parameter, may be determined—such as the operating pressure $P_p$ of the pump 16, the pump speed ω, the swashplate angle α, the cylinder speed $\dot{x}$, the cylinder head end control pressure $P_h$, and/or the cylinder rod end return pressure $P_r$—for example by using the sensors 90, 100, 84, 94, 88 described hereinabove. For explanatory purposes, the operating pressure $P_p$ of the pump 16 may be considered the reference operating pressure. However, it should be appreciated that alternative operating parameters may be considered the reference operating parameter.

In a second flow block 132, one or more estimated working condition values, such as $\phi_p$, $\phi_c$, $\gamma_p$, $\gamma_c$, and $\beta_{ep}$, $\beta_{ec}$, may be determined, for example by predicting such values based on optimum operating conditions, e.g., assuming a predetermined amount of leakage and/or cavitation within the system 12. It should be appreciated that other methods may be used to determine the estimated working condition value(s), such as using previously established working condition values of the system 12 or by using a lookup table, for example.

In a third flow block 136, a model (e.g., estimated) operating parameter, such as a model operating pressure $P_{pm}$ for the pump 16, may be determined using the estimated working condition value(s) (from block 132) and using one or more of the operating parameter(s) (from block 124). It should be appreciated that the model operating pressure $P_{pm}$ may be determined, for example, by using the relationships described above between the system working condition values and the system dynamics (e.g., Eqs. 6, 11, 14, 21).

In a fourth flow block 140, the model operating parameter, e.g., the model operating pressure $P_{pm}$ of the pump 16, is compared to the reference operating parameter, e.g., the operating pressure $P_p$ of the pump 16 (from block 124), to determine whether the model operating parameter bears a desired relationship with the reference operating parameter. For example, the model operating parameter may be compared with the reference operating parameter to determine whether the model operating parameter substantially equals, or is within a predetermined range of, the reference operating parameter (error determination).

If the model operating parameter does not bear the desired relationship with the reference operating parameter (e.g., the model operating parameter does not substantially equal the reference operating parameter), the present method may advance to a fifth flow block 144, wherein the estimated working condition value(s) (from block 132) may be modified as a function of the reference operating parameter. For example, the estimated working condition value(s) may be modified as a function of the relationship between the model operating parameter and the reference operating parameter (e.g., as a function of the difference between the model operating parameter and the reference operating parameter). It should be appreciated that an adaptive learning rule 116, 116' may be used to modify the estimated working condition value(s).

After modification of the working condition value(s) in flow block 144, the present method may return to flow blocks 136 and 140, wherein a new model operating parameter may be determined and compared with a reference operating parameter.

Beginning again at flow block 140, if the model operating parameter bears a desired relationship with the reference operating parameter (e.g., the model operating parameter substantially equals, or is within a predetermined range of, the reference operating parameter), the present method may advance to flow block 148, wherein the estimated working condition value(s) may be used to indicate the operating health of the hydraulic system 12. More specifically, if the model and reference operating parameters are substantially equal, for example, then error convergence has occurred and the estimated working condition value(s) may be indicative of the corresponding actual working condition value(s) of the system 12.

Thus, using the present method, working condition values may be identified to, for example, (1) determine leakage amounts within the hydraulic system 12, such as within the pump 16 and/or the actuator 20, e.g., by determining $\phi_p$, $\phi_c$, $\gamma_p$, $\gamma_c$ $C_{lp}$, and/or $C_{lc}$; and/or (2) determine an effective bulk modulus value of at least part of the hydraulic system, e.g., by determining $\beta_{ep}$, $\beta_{ec}$. Moreover, as described above, such working condition values may be indicative of trapped air and/or cavitation within the hydraulic system 12.

It should be appreciated that once the desired working condition value(s) are identified, these value(s) may be compared with predetermined working condition value(s) within the health database 120, such as within a lookup table, to determine the relative operating health of the system 12. It should be appreciated that the term "predetermined working condition value(s)" may include, for example, any working condition value(s) determined prior to and/or independent of the working condition values from flow block 148.

Further, the working condition value(s) may be saved within the health database 120 and evaluated over time to detect or predict a change in—such as the deterioration of—the system's operating health. For example, if the working condition value(s) indicate increasing leakage amounts within the system 12, as with increasing values of $\phi_p$, $\phi_c$, $\gamma_p$, and/or $\gamma_c$, deterioration of system componentry and/or one or more seals 76 may be indicated. Similarly, if the working condition value(s) of $\beta_{ep}$ and/or $\beta_{ec}$ suddenly decrease, trapped air or cavitation within the system 12 may be indicated.

INDUSTRIAL APPLICABILITY

The present invention provides a robust apparatus and method that may be used to effectively monitor the operating health (e.g., health condition) of a hydraulic system 12. An exemplary use of such a hydraulic system 12 may be found on an earthworking machine, such as a loading machine, an excavating machine, a bull dozer, or the like. The present invention may be used during normal operation of the earthworking machine, for example, as an on-line monitoring device to determine the operating health of the earthworking machine's hydraulic system 12 in real time. Thus, maintenance operations to repair or prevent undesirable conditions within the earthworking machine's hydraulic system 12 may be scheduled before catastrophic failure of the system 12 occurs or before substantial deterioration of the system 12 occurs. Therefore, significant operating downtime for the earthworking machine may be avoided.

Moreover, the present invention may be used during normal operation of the hydraulic system 12 to detect or predict performance deficiencies within a hydraulic system 12 or to detect or predict operating inefficiencies, which may be caused by such conditions as leakage, entrapped air, or cavitation within the hydraulic system 12.

Further, because the present invention may be used to determine a plurality of working condition values, the present invention may be used to determine whether an operating condition is being caused by leakage within the system or is being caused by entrapped air or cavitation within the system. Moreover, the present invention may be used to determine whether leakage, entrapped air, cavitation, or other operating conditions are occurring (and amounts thereof) in specific components or areas of a hydraulic system 12.

From the foregoing it will be appreciated that, although specific embodiments of the invention have been described herein for purposes of illustration, various modifications may be made without deviating from the spirit or scope of the invention. Other embodiments of the invention will be apparent to those skilled in the art from consideration of the specification and figures and practice of the invention disclosed herein. It is intended that the specification and examples be considered as exemplary only, with a true scope and spirit of the invention being indicated by the following claims and their equivalents. Accordingly, the invention is not limited except as by the appended claims.

What is claimed is:

1. A method for determining the operating health of a hydraulic system, the method comprising the steps of:

determining a plurality of operating parameters of the hydraulic system during operation of the hydraulic system;

using the operating parameters to determine one or more working condition values of the system;

wherein:

a first one of the one or more working condition values is indicative of an effective bulk modulus value of an operating fluid within at least part of the hydraulic system.

2. The method of claim 1, wherein the first working condition value is indicative of an effective bulk modulus value of an operating fluid within a hydraulic pump.

3. The method of claim 1, wherein the first working condition value is indicative of an effective bulk modulus value of an operating fluid within a hydraulic actuator.

4. The method of claim 1, wherein a second one of the one or more working condition values is indicative of an amount of leakage within at least part of the hydraulic system.

5. The method of claim 2, wherein at least one of the working condition values is indicative of a cavitation or entrapped air condition within at least part of the hydraulic system.

6. An apparatus for determining the operating health of a hydraulic system, the apparatus comprising:

a plurality of sensors operably connected to the hydraulic system and operable to indicate operating parameters of the hydraulic system during operation of the hydraulic system; and at least one processor operably connected in electrical communication with the sensors, the at least one processor being operable to determine one or more working condition values as a function of the actual operating parameters, a first one of the one or more working condition values being indicative of an effective bulk modulus value of an operating fluid within at least part of the hydraulic system.

7. The apparatus of claim 6, wherein a second one of the one or more working condition values is indicative of an amount of leakage within at least part of the hydraulic system.

8. The apparatus of claim 6, wherein:

the hydraulic system includes first and second fluid drive members disposed in fluid communication with each other; and the plurality of sensors includes a first sensor operably connected with the at least one processor and operable to indicate an operating pressure of the first fluid drive member and a second sensor operably connected with the at least one processor and operable to indicate an operating pressure of the second fluid drive member.

9. The apparatus of claim 8, wherein the plurality of sensors further includes:

a third sensor operably connected with the at least one processor and operable to indicate an operating speed or position of the first fluid drive member; and a fourth sensor operably connected with the at least one processor and operable to indicate an operating speed or position of the second fluid drive member.

10. The apparatus of claim 6, wherein:

the hydraulic system includes a hydraulic pump and a hydraulic actuator disposed in fluid communication with the hydraulic pump; and the plurality of sensors includes:

a first sensor operably connected with the at least one processor and operable to indicate an operating pressure of the pump;

a second sensor operably connected with the at least one processor and operable to indicate an operating speed of the pump;

a third sensor operably connected with the at least one processor and operable to indicate an operating pressure of the actuator; and a fourth sensor operably connected with the at least one processor and operable to indicate an operating speed or position of the actuator.

11. The apparatus of claim 10, wherein the actuator is a hydraulic piston and cylinder arrangement.

12. The apparatus of claim 10, further comprising a swashplate;

wherein the plurality of sensors includes a fifth sensor operably connected with the at least one processor and operable to indicate a swashplate angle.

* * * * *

UNITED STATES PATENT AND TRADEMARK OFFICE

CERTIFICATE OF CORRECTION

PATENT NO. : 7,204,138 B2
APPLICATION NO. : 11/369333
DATED : April 17, 2007
INVENTOR(S) : Du It is certified that error appears in the above-identified patent and that said Letters Patent is hereby corrected as shown below:

In Column 7, in Equation 4, delete " $\dot{P}_p = \beta_{ep} \frac{D_p \omega \alpha}{V(\alpha)} - \frac{\beta_{ep} C_{lp}}{V(\alpha)} P_p - \frac{\beta_{ep}}{V(\alpha)} (C_{lc}(P_h - P_r) - A_h \dot{x})$ "

and insert -- $\dot{P}_p = \beta_{ep} \frac{D_p \omega \alpha}{V(\alpha)} - \frac{\beta_{ep} C_{lp}}{V(\alpha)} P_p - \frac{\beta_{ep}}{V(\alpha)} (C_{lc}(P_h - P_r) + A_h \dot{x})$ --, therefor.

In Column 7, Equation 5, delete " $\dot{P}_p = \beta_{ep} \left( \frac{D_p \omega \alpha}{V(\alpha)} - \frac{A_h \dot{x}}{V(\alpha)} \right) - \beta_{ep} C_{lp} \frac{P_p}{V(\alpha)} - \beta_{ep} C_{lp} \frac{P_h - P_r}{V(\alpha)}$ ,"

and insert -- $\dot{P}_p = \beta_{ep} \left( \frac{D_p \omega \alpha}{V(\alpha)} - \frac{A_h \dot{x}}{V(\alpha)} \right) - \beta_{ep} C_{lp} \frac{P_p}{V(\alpha)} - \beta_{ep} C_{lc} \frac{P_h - P_r}{V(\alpha)}$ --.

Signed and Sealed this

Eighth Day of July, 2008

JON W. DUDAS

*Director of the United States Patent and Trademark Office*